June 24, 1930.                W. A. SHOTTS                1,766,407
                      COMBINATION PLOW AND CULTIVATOR
                        Filed April 17, 1929    2 Sheets-Sheet 1

W.ᵐA. Shotts
INVENTOR
BY Victor J. Evans
ATTORNEY

June 24, 1930.  W. A. SHOTTS  1,766,407
COMBINATION PLOW AND CULTIVATOR
Filed April 17, 1929    2 Sheets-Sheet 2
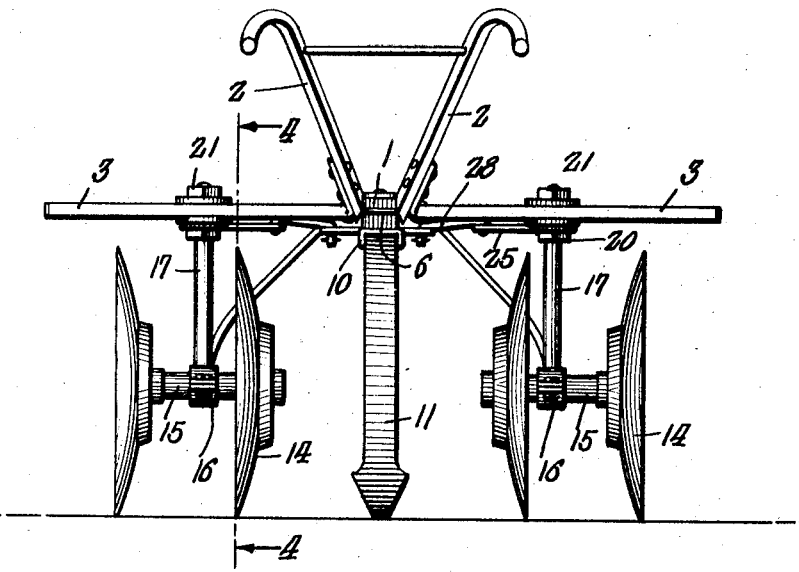
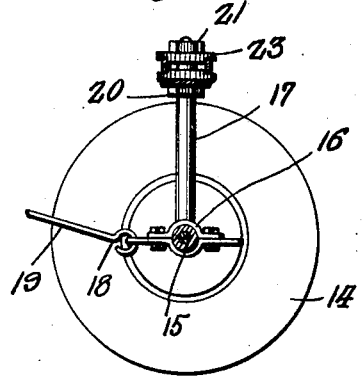
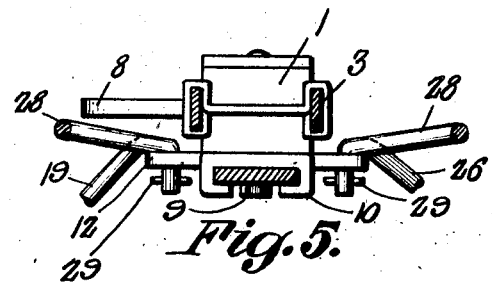
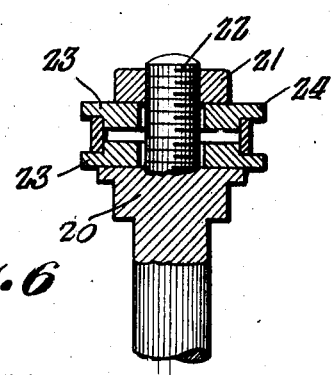
Wm. A. Shotts,
INVENTOR
BY Victor J. Evans
ATTORNEY Patented June 24, 1930

1,766,407

UNITED STATES PATENT OFFICE

WILLIAM A. SHOTTS, OF HACKLEBURG, ALABAMA, ASSIGNOR OF ONE-THIRD TO J. S. CONWAY AND ONE-THIRD TO H. M. CONWAY, BOTH OF HACKLEBURG, ALABAMA

COMBINATION PLOW AND CULTIVATOR

Application filed April 17, 1929. Serial No. 355,899.

My present invention has reference to an agricultural implement and my object is the provision of a combination disc plow and cultivator which shall be of an extremely simple construction, light in weight, which may be operated by a single hand and drawn by a single animal.

A further object is the provision of means whereby the disc plows may be easily, quickly and securely arranged at any desired angle with respect to the plow beam.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claim.

In the drawings:

Figure 3 is a rear elevation thereof.

Figure 4 is a sectional view on the line 4—4 of Figure 3.

Figure 5 is a sectional view on the line 5—5 of Figure 2.

Figure 6 is a detail enlarged transverse sectional view to illustrate the manner in which the standards are adjustably secured on the frame.

Figure 1:
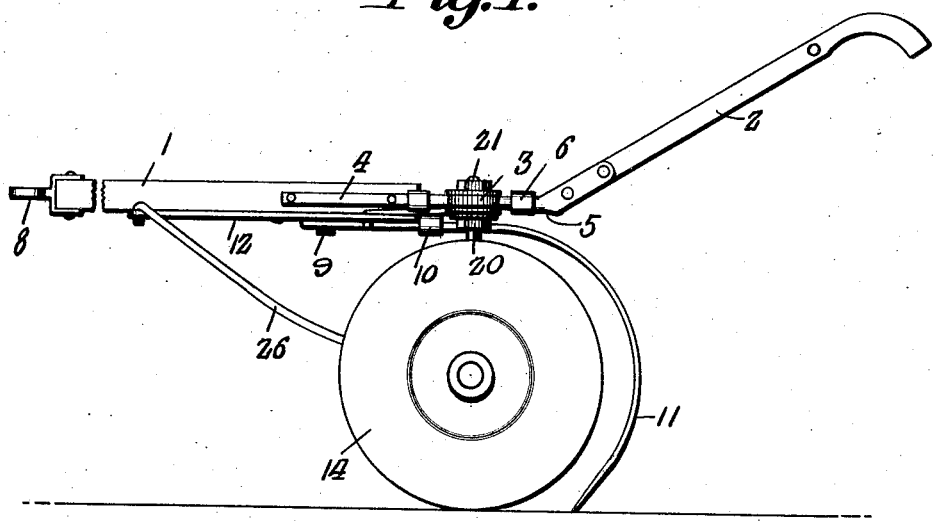
Figure 1 is a side elevation of my improvement.
Figure 2:
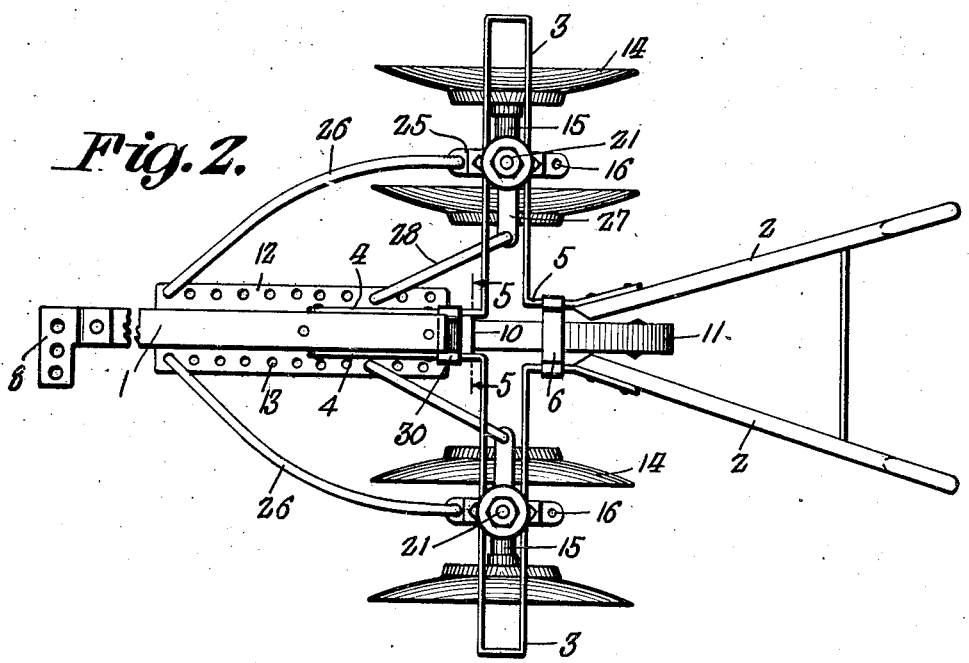
Figure 2 is a top plan view thereof.

The beam of my improvement is indicated by the numeral 1, and the angularly disposed handles by the numeral 2. The beam and handles are connected to a frame of a particular and peculiar construction. The main portion of the frame is arranged transversely with respect to the beam and to the handles and comprises a centrally split member which is substantially rectangular in plan. This portion of the frame is indicated by the numeral 3. Obviously the frame 3 is of strong and sturdy metal, the confronting ends thereof, which are arranged in the center of the frame are extended in opposite directions, two of such ends indicated for distinction by the numeral 4 being secured to the sides of the beam 1 and the other ends have their extremities arranged at opposite angles and secured to the sides of the handles 2. Between the straight portions 5 of these last mentioned ends there is a brace 6, and, of course, the handle members may be connected by plates or rods to the said brace. However, in practice I have not found this necessary, as it is one of the desirable features of my invention to provide an implement of this character which can be readily operated by a single hand and propelled by a single draft animal. The outer end of the beam 1 has fixed thereto an angle apertured plate 8 in the nature of a clevis designed to engage a hook on the traces of the draft animal.

The frame, broadly indicated by the numeral 3, is substantially rectangular in cross section, and below the beam 1 and fixed thereto by bolts or like elements 9 there is a cross sectionally U-shaped member 10 that receives between the body and the flanges thereof the forward portion of a rearwardly extending arched spring tooth 11. The brace 10, it should be stated, is formed on one end of a plate and the securing means 9 pass through the body of the plate and enter the beam 1. There may be integrally formed on the brace or there may be secured upon the upper face of the beam 1 a longitudinally extending plate 12 which projects a suitable distance beyond the sides of the beam. The projecting portions of the plate 12 are provided with series of preferably equidistantly spaced longitudinally arranged apertures 13, the purpose of which will presently be apparent.

The cultivator or plow discs are arranged in pairs at the opposite sides of the beam and each pair is designated by the numeral 14. Each pair of discs is centrally mounted upon a shaft 15. Each shaft is revoluble in a two-part bearing 16, the upper portion of each bearing being formed with a standard 17. The lower element of the bearing is extended a suitable distance beyond the upper part thereof, and each of these extending portions is formed with an aperture, the forward portion receiving therethrough the hooked end 18 of a rod 19 which has its second end also hooked and received in one of the apertures 13 on each side of the plate, 12.

Each standard has an enlarged and what I will term a headed end 20 that underlies the lower edges of the laterally extending side members of the frame 3. From the head the standard is formed with a threaded extension 21 on which is screwed a nut 22. Received on each of the threaded or bolt extensions 21 of the standards 20 there are two plates 23, respectively. Each of the plates, on the outer edge thereof has its confronting face notched, as at 24, and in these notches there are received the side members of the laterally extending members of the frame 3. The lower bearing element or plate 23 is formed, on both of its edges with extensions 25 which are apertured and which receive therein the inner hooked ends of arched rods 26, the outer hooked ends being also received in the apertures 13.

To more effectively hold the disc plows or cultivators angularly adjusted with respect to the frame and the beam of the implement either the upper or lower bearing plate 23 is provided with an inwardly extending arm 27 whose outer end is apertured to receive therein the inner hooked end of a rod 28, the second hooked end of the rod being received in desired apertures 13 in the plate 12. Of course, all of the hooked ends of the rods may be threaded and may be engaged by nuts although in the drawings the ends of the rods are apertured for the reception of cotter pins 29.

It will be apparent that by bringing the outer hooked ends of the rods into desired apertures 13 in the plate 12 and by loosening the nuts 22 the discs 14 may be arranged at varying desired angles with respect to the longitudinal plane of the machine. It will be further noted that the discs may be moved inwardly toward the center of the frame or outwardly therefrom and held effectively secured in either of such positions. It will be also noted that the device is of an extremely simple nature and construction, and that the parts constituting the same may be braced or otherwise reinforced in a different manner than that disclosed by the drawings, as for instance, the outwardly projecting arms 4 of the frame 3 may have arranged thereon, to the rear of the beam 1, a brace element 30, and other such minor changes may be made.

Having described the invention, I claim:

An agricultural implement of the class described comprising a draft beam, a plate having a U-shaped guide on the under face of the beam, a second plate also secured on the under face of the beam and extending laterally thereof and having its said extensions provided with series of longitudinally arranged apertures, an arched spring tooth having a straight portion received through the guide and also fixed to the under face of the beam, a centrally split substantially rectangular frame having its split ends spaced and provided with oppositely directed extensions, the forward extensions being fixed to the sides of the beam, brace beams between the extensions, the rear extensions having angle ends, spaced handle members secured to said ends, discs arranged in pairs, a shaft connecting each pair of discs and upon which shafts the discs are rotatable, a standard having a bearing for each shaft, a rod member connected with each bearing and having a hooked end to engage with the apertures in the plate, each of said standards having an upper and enlarged end which merges into a centrally arranged threaded extension that is received between the sides of the rectangular frame at points opposite the longitudinal center thereof, spaced pairs of bearing plates having their edges notched to receive the spaced members of the frame therein and bolts screwed on the threaded extensions of the standards, said bearings having longitudinally arranged oppositely extending portions which are apertured, an arched rod having hooked ends, one of which is received in the aperture of each of the forward extensions and the second end being also hooked and received in certain of the apertures in the plate, said bearings having inwardly extending apertured extensions, rods having hooked ends received in said apertures and also received in certain of the apertures in the plate.

In testimony whereof I affix my signature.

WILLIAM A. SHOTTS.